Jan. 26, 1954  G. HERZOG  2,667,583
ANALYSIS OF SUBSURFACE FORMATIONS BY RADIOACTIVITY
Filed Feb. 3, 1951
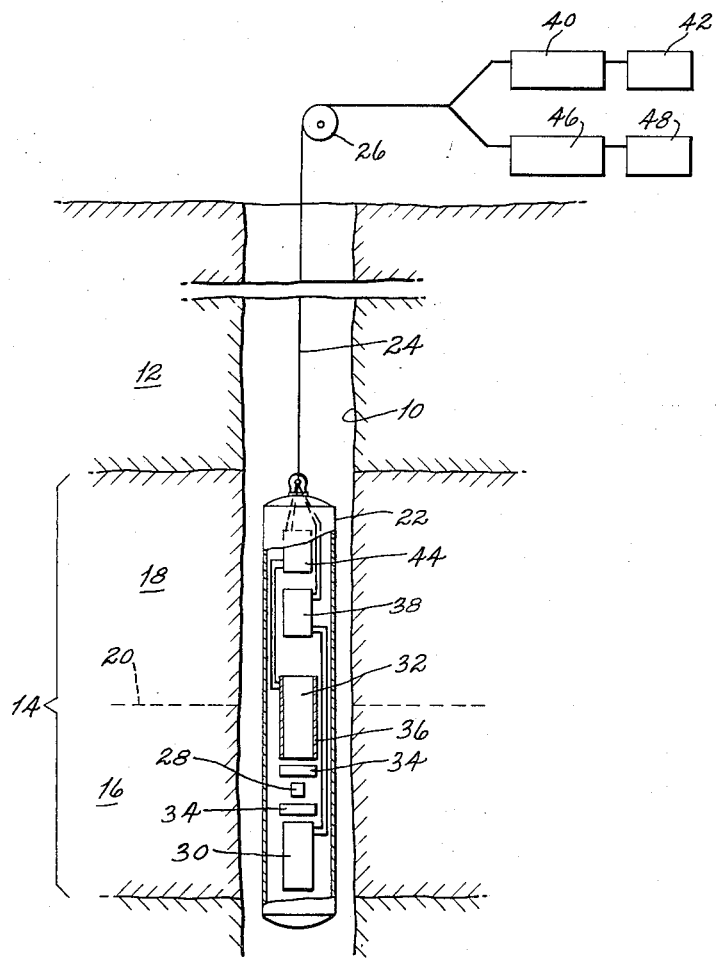
INVENTOR.
GERHARD HERZOG
BY
ATTORNEYS Patented Jan. 26, 1954

2,667,583

UNITED STATES PATENT OFFICE 2,667,583

ANALYSIS OF SUBSURFACE FORMATIONS BY RADIOACTIVITY

Gerhard Herzog, Houston, Tex., assignor to The Texas Company, New York, N. Y., a corporation of Delaware Application February 3, 1951, Serial No. 209,239

6 Claims. (Cl. 250—43.5)

This invention relates to the logging of wells or bore holes and more particularly to a method and an apparatus by means of which determinations can be made as to whether a porous formation or a sand traversed by the bore hole contains salt water and hydrocarbon oil and the location of the interface between salt water and oil containing portions of a formation.

In the production of hydrocarbon oil from the earth it is very desirable to know whether a particular formation which has been shown to be porous, such as a sand formation, contains hydrocarbon oil or salt water or both. In the latter case the oil will, of course, float upon the water and knowledge as to the exact position or even the existence of an interface between the water and oil containing portions will be of great value. As an example it may be found desirable to perforate the casing opposite the oil so that the oil can be produced. In the past many difficulties have arisen and in many instances the casing has been perforated below the water-oil interface thus causing water to be produced rather than the oil. It is well known that in an oil well fresh water is very seldom encountered.

In the technical report #21 on "Nuclear Shielding Studies," issued August 31, 1949, by the Laboratory for Nuclear Science and Engineering at the Massachusetts Institute of Technology experiments are described in which several substances have been bombarded with neutrons and scattered neutrons have been measured with different neutron detectors, that is with detectors which individually respond to neutrons of different energies. In the experiments a "thermal" detector was used to measure the intensity of neutrons having an energy below .3 ev. and an indium resonance detector was used to measure the intensity of neutrons having 1.44 ev. A lead iodide foil detector was also used to measure the intensity of neutrons having energies of around 40 ev. This report shows that where sand of about 39% porosity was bombarded by neutrons and scattered neutrons of 1.44 ev. were measured, the same detector response was obtained whether the pore spaces were filled with fresh water or with 92% brine and this was true regardless of the distance between the neutron source and the detector. The report also shows that when thermal neutrons were observed the fresh water gave a higher detector response than brine also for all distances between source and detector. The findings or principles set forth in this report are made use of in this invention in the provision of a method for determining whether a sand contains salt water and oil and if so the location of the interface between the salt water and oil.

In accordance with the invention a logging instrument containing a source of neutrons is adapted to be passed through the bore hole or a portion thereof while suspended from the surface by means of a conductor cable. A thermal neutron detector is disposed within the instrument either above or below and fairly close to the source and a detector of neutrons having energies higher than thermal is disposed in vertical alignment at the other side of and also close to the source. Neutrons emitted by the source bombard the formation being studied, and depending upon the porosity and other characteristics of the formation, some of these neutrons will be scattered, slowed down and returned to the hole. The low energy or thermal neutrons so returned may be registered by the thermal neutron detector and the higher energy neutrons by the other detector. Assuming that the instrument is being pulled upwardly through a formation which contains both salt water and oil and that the instrument is just passing the interface between the water and the oil portions or layers, and also assuming that the porosity is the same in both portions of the formation, the response or the output of the detector for neutrons of higher than thermal energy will remain substantially constant whereas the response of the thermal neutron detector will suddenly increase as the detector passes the interface. In the M. I. T. report mentioned above it was shown that for thermal neutrons, with a source-detector spacing of 10 cm. brine gives a counting rate of 1600 and fresh water a counting rate of 5600 while the neutrons of 1.44 ev. show for brine and for water the same counting rate of 900 under the same conditions. It is generally well known that hydrocarbons behave identically with respect to neutrons as does fresh water. Therefore if hydrocarbons are substituted for the fresh water in the data of the M. I. T. report it will be seen that, with the arrangement which has been described, salt water and hydrocarbon oil can be distinguished in a producing sand or formation.

For a better understanding of the invention reference may be had to the accompanying drawing which is a vertical sectional view through a portion of a bore hole or well showing suspended therein an instrument embodying the features of this invention.

Referring to the drawing a bore hole 10 is shown as traversing subsurface formations such as those indicated at 12 and 14. The formation 14 is assumed to be porous i. e., a sand containing a salt water portion 16 and an upper hydrocarbon oil portion 18 separated by the interface 20. The hole 10 may or may not be provided with a casing since neutrons will pass through the conventional oil well casing with but very little loss.

An elongated detector housing 22 is shown suspended within the bore hole from the conductor cable 24 extending upwardly to the surface and over a suitable measuring device or reel 26 which serves to indicate the amount of cable paid out and therefore the depth of the instrument in the hole. Within the instrument housing 22 is a source of neutrons 28 such as a mixture of radium and beryllium or polonium and beryllium. Shown directly below the source 28 is a thermal neutron detector 30 and symmetrically disposed above the source is a detector 32 of neutrons having energies higher than thermal. Each detector is separated from the source by shields 34 a hydrogeneous material and cadmium or the like capable of absorbing neutrons which would otherwise pass directly from the source 28 to the detectors. The detectors 30 and 32 are both sensitive to slow neutrons and of such a type that their response or output will depend upon the energy of the neutrons intercepted. These detectors may be in the form of proportional counters and may, for example, be of the kind shown in the U. S. Letters Patent 2,512,769, granted to K. C. Crumrine June 27 1950. In the Crumrine counter the cathode is coated with a substance such as boron carbide from which alpha particles will be ejected to cause ionization of the surrounding gas when the substance is struck by slow neutrons. If desired, the detectors may be in the form of scintillation neutron counters the outputs of which will depend upon the energies of the intercepted neutrons. The detector 32 is shown as surrounded at its sides by a layer 36 of a material such as cadmium capable of absorbing thermal neutrons before they reach the detector. The output of the detector 30 is conducted to a suitable preamplifier 38 the output of which in turn passes through the cable 24 to an amplifier 40 at the surface and this amplifier is connected to any suitable indicating or recording instrument 42. The output of the detector 32 passes to a preamplifier 44 and its output passes through the cable 24 to an amplifier 46 and then to an indicating or recording device 48.

With the arrangement shown, the detector 32 will respond to neutrons having higher than thermal energies, the thermal neutrons being absorbed in the shielding layer 36. The detector 30 will respond both to the thermal neutrons and to those of higher energy. By subtracting the output of the detector 32 from the output of detector 30 the resulting output will be that due to the thermal neutrons which have been intercepted by the detector 30. This subtraction can be taken care of by any suitable well known subtractive circuit.

Assuming that the instrument 22 is being pulled upwardly, the outputs both of the thermal detector 30 and of the higher than thermal neutron detector 32 will be observed. Let us assume that the thermal neutron detector 30 shows an increase in counting rate. Such a shift may be explained by the fact that the instrument has passed from a water (brine) saturated part 16 of a formation to the oil saturated part 18. The shift, however, can also be explained by assuming that the instrument has passed from that part of a formation which has high porosity to another part which has lower porosity, (see Figure 9 of the M. I. T. report, for example, at a distance of 20 centimeters), while both sections of this formation are, however, 100% saturated with either water (brine) or oil. In other words, from a measurement with the thermal detector 30 alone, one cannot decide whether a change in counting rate is due to a change in porosity or a change in oil (or water) saturation while the porosity remains unchanged. This ambiguity can then be solved by observing the behavior of the second detector 32 which measures the neutrons of higher than thermal energy. If the output of this detector does not change one knows that the porosity has not changed and therefore the change in response of the thermal detector 30 may be assumed to be due to a change in oil and water saturation.

It will be understood that the preamplifiers 38 and 44, the amplifiers 40 and 46 and the recorders 42 and 48 may be of any suitable type and that the detectors 30 and 32 may be other than those which have been described, it being essential merely that both of these detectors are sensitive to slow neutrons and that their output will depend on the energies of the neutrons intercepted.

Obviously many modifications and variations of the invention as hereinbefore set forth may be made without departing from the spirit and scope thereof, and only such limitations should be imposed as are indicated in the appended claims.

I claim:

1. The method of logging a bore hole to determine whether a formation traversed by the hole contains salt water or hydrocarbon oil, which comprises bombarding said formation with neutrons from a source passed through the bore hole, measuring in the vicinity of said source neutrons of relatively low energy scattered in the formation and returned to the hole, simultaneously measuring also in the vicinity of the source neutrons of relatively high energy which are scattered in the formation and return to the hole, and comparing the measured intensities of the neutrons of both low and high energies as the source passes vertically through the formation being bombarded.

2. The method of logging a bore hole to determine whether a formation traversed by the hole contains salt water or hydrocarbon oil, which comprises bombarding said formation with neutrons from a source passed through the bore hole, measuring in the vicinity of said source neutrons of thermal energy scattered in the formation due to said bombardment and return to the hole, simultaneously measuring also in the vicinity of the source neutrons of higher than thermal energy which are scattered in the formation due to said bombardment, and comparing the measured intensities of the neutrons of both thermal and higher than thermal energies as the source passes vertically upwardly through the formation being bombarded, an increase in the measured intensity of the thermal neutrons with no change in the measured intensity of the higher energy neutrons indicating that the measuring instrument is passing from a salt water containing portion of the formation into a hydrocarbon oil containing portion.

3. The method of logging a bore hole to determine whether the formations traversed by the hole contain salt water or hydrocarbon oil, which comprises passing a logging instrument through said hole, bombarding a formation with neutrons from a source in said instrument, detecting within said instrument and in the vicinity of said source neutrons of thermal energy scattered in the formation due to said bombardment and returned to the hole, simultaneously detecting within said instrument and also in the vicinity of the source neutrons of higher than thermal energy which are scattered in the fomation due to said bombardment, and comparing the detected intensities of the neutrons of both thermal and higher than thermal energies as the source passes vertically through the formation being bombarded.

4. The method of logging a bore hole to determine the location of the interface between salt water and hydrocarbon oil in a formation containing both, which comprises bombarding said formation with neutrons from a source moved through the bore hole past said formation, measuring in the vicinity of said source neutrons of thermal energy scattered in the formation due to said bombardment and returned to the hole, simultaneously measuring also in the vicinity of the source neutrons of higher than thermal energy which are scattered in the formation due to said bombardment, and comparing the measured intensities of the neutrons of both thermal and higher than thermal energies as the source passes vertically through the formation being bombarded, and measuring the depth of the source in the hole when a change occurs in the measured intensity of the thermal neutrons with no change in the measured intensity of the higher energy neutrons, the change in intensity of the measured thermal neutrons indicating that the source is passing from a salt water containing portion of the formation into a hydrocarbon oil containing portion, or vice versa.

5. The method of logging a bore hole to determine whether a formation traversed by the hole contains salt water and hydrocarbon oil, which comprises bombarding said formation with neutrons from a source passed through the bore hole, measuring in the vicinity of said source neutrons of thermal and higher than thermal energy scattered in the formation and returned to the hole, simultaneously measuring also in the vicinity of the source neutrons of higher than thermal energy which are scattered in the formation, and subtracting the measured intensity of the neutrons of higher than thermal energy from the measured intensity of the neutrons of both thermal and higher than thermal energy to obtain the intensity of the neutrons of thermal energy, and noting any change in the intensity of the scattered thermal neutrons while no change appears in the intensity of the scattered neutrons of higher than thermal energy as the source passes vertically through the formation being bombarded, such a change in thermal neutron intensity indicating the position of the interface between salt water and hydrocarbon oil.

6. The method of logging a well bore hole to determine the porosity of earth formations traversed by the hole, which comprises bombarding said formations with neutrons from a source passed through the hole and measuring within the hole in the vicinity of the source the intensity of neutrons of higher than thermal energy, i. e., neutrons having energies between .3 and 10 electron volts, which are scattered in said formations and returned to the hole while excluding from said measurements neutrons of thermal energy, i. e., neutrons having energies below .3 electron volts, the intensity of said measured higher energy neutrons being indicative of the porosity of the formation being bombarded regardless as to whether or not said formation contains salt water, fresh water or hydrocarbon oil.

GERHARD HERZOG.

References Cited in the file of this patent

UNITED STATES PATENTS

| Number | Name | Date |
|---|---|---|
| 2,220,509 | Brons | Nov. 5, 1940 |
| 2,303,688 | Fearon | Dec. 1, 1942 |
| 2,334,262 | Hare | Nov. 16, 1943 |
| 2,508,772 | Pontecorvo | May 23, 1950 |
| 2,512,020 | Herzog | June 20, 1950 |